(12) United States Patent
Garfinkle et al.

(10) Patent No.: US 6,924,878 B2
(45) Date of Patent: *Aug. 2, 2005

(54) METHOD OF PROCESSING A ROLL OF EXPOSED PHOTOGRAPHIC FILM CONTAINING PHOTOGRAPHIC IMAGES INTO CORRESPONDING DIGITAL IMAGES AND THEN DISTRIBUTING VISUAL PRINTS PRODUCED FROM THE DIGITAL IMAGES

(75) Inventors: Philip N. Garfinkle, Herndon, VA (US); Yaacov Ben Yaacov, Jerusalem (IL); Elliot D. Jaffe, Hashmonaem (IL)

(73) Assignee: Eastman Kodak Company, Rochester, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 10/039,547

(22) Filed: Nov. 9, 2001

(65) Prior Publication Data

US 2002/0071678 A1 Jun. 13, 2002

Related U.S. Application Data

(63) Continuation of application No. 09/490,341, filed on Jan. 24, 2000, now Pat. No. 6,512,570, which is a continuation of application No. 08/773,756, filed on Dec. 24, 1996, now Pat. No. 6,017,157.

(51) Int. Cl.[7] .................. G03B 27/52; G03B 27/32; G03G 27/00; G06F 17/60

(52) U.S. Cl. ...................... 355/40; 355/18; 355/77; 396/429; 705/27; 709/219

(58) Field of Search .................. 355/18, 40, 77; 396/311, 429; 358/1.15, 506, 487, 527; 348/96, 211, 552; 705/1, 26, 27, 40, 51, 57, 58, 59; 707/104.1; 709/217, 219

(56) References Cited

U.S. PATENT DOCUMENTS

| 4,417,811 A | 11/1983 | Hamer |
|---|---|---|
| 4,432,637 A | 2/1984 | Baschung |
| 4,862,200 A | 8/1989 | Hicks |
| 4,862,222 A | 8/1989 | Staude et al. |
| 4,918,484 A | 4/1990 | Ujiie et al. |
| 4,935,809 A | 6/1990 | Hayashi et al. |
| 4,951,086 A | 8/1990 | Hicks |
| 4,974,096 A | 11/1990 | Wash |

(Continued)

FOREIGN PATENT DOCUMENTS

| GB | 2286944 | * 8/1995 |
|---|---|---|

OTHER PUBLICATIONS

"Introducing the Shortest Distance From . . . ", Kodak Digital Science publication, date believed to be approximately 1995 to 1996.
Kodak Picture Exchange, User's Guide for Macintosh Computers, copyright 1993.
Kodak Picture Exchange (Digital Imaging Plus Mar. 1994), Dial a picture –in seconds by John Henshall.

*Primary Examiner*—Alan Mathews
(74) *Attorney, Agent, or Firm*—Frank Pincelli

(57) ABSTRACT

This invention is directed to a method of processing at least one digital image of at least one photographic image and distributing at least one visual print produced from the at least one digital image. The method includes the steps of storing at least one digital image of at least one photographic image on at least one image server at a first location. Selective authorized access to the at least one digital image of the at least one photographic image from a second location is then facilitated. Orders are received for at least one visual print of the at least one photographic image from the second location. Based upon the orders, at least one visual image is produced from the stored digital image at the first location in response to the at least one order.

33 Claims, 18 Drawing Sheets

U.S. PATENT DOCUMENTS

| | | | | |
|---|---|---|---|---|
| 5,023,655 A | | 6/1991 | Hicks | |
| 5,070,677 A | | 12/1991 | Hicks | |
| 5,072,254 A | | 12/1991 | Hicks et al. | |
| 5,072,256 A | | 12/1991 | Hicks | |
| 5,093,682 A | | 3/1992 | Hicks | |
| 5,097,292 A | | 3/1992 | Hicks | |
| 5,218,455 A | | 6/1993 | Kristy | |
| 5,319,401 A | | 6/1994 | Hicks | |
| 5,321,465 A | | 6/1994 | Hicks | |
| 5,388,252 A | * | 2/1995 | Dreste et al. | 714/46 |
| 5,428,747 A | * | 6/1995 | Kitamoto | 710/1 |
| 5,477,353 A | | 12/1995 | Yamasaki | |
| 5,512,396 A | | 4/1996 | Hicks | |
| 5,649,185 A | * | 7/1997 | Antognini et al. | 707/9 |
| 5,666,215 A | | 9/1997 | Fredlund et al. | |
| 5,734,719 A | * | 3/1998 | Tsevdos et al. | 700/234 |
| 5,760,916 A | * | 6/1998 | Dellert et al. | 358/408 |
| 5,768,633 A | * | 6/1998 | Allen et al. | 396/2 |
| 5,784,461 A | * | 7/1998 | Shaffer et al. | 705/51 |
| 5,799,219 A | * | 8/1998 | Moghadam et al. | 396/319 |
| 6,017,157 A | | 1/2000 | Garfinkle et al. | |
| 6,133,985 A | | 10/2000 | Garfinkle et al. | |
| 6,154,295 A | * | 11/2000 | Fredlund et al. | 358/487 |
| 6,222,646 B1 | * | 4/2001 | Maurinus et al. | 358/440 |
| 6,243,171 B1 | * | 6/2001 | Haneda | 358/1.15 |

* cited by examiner

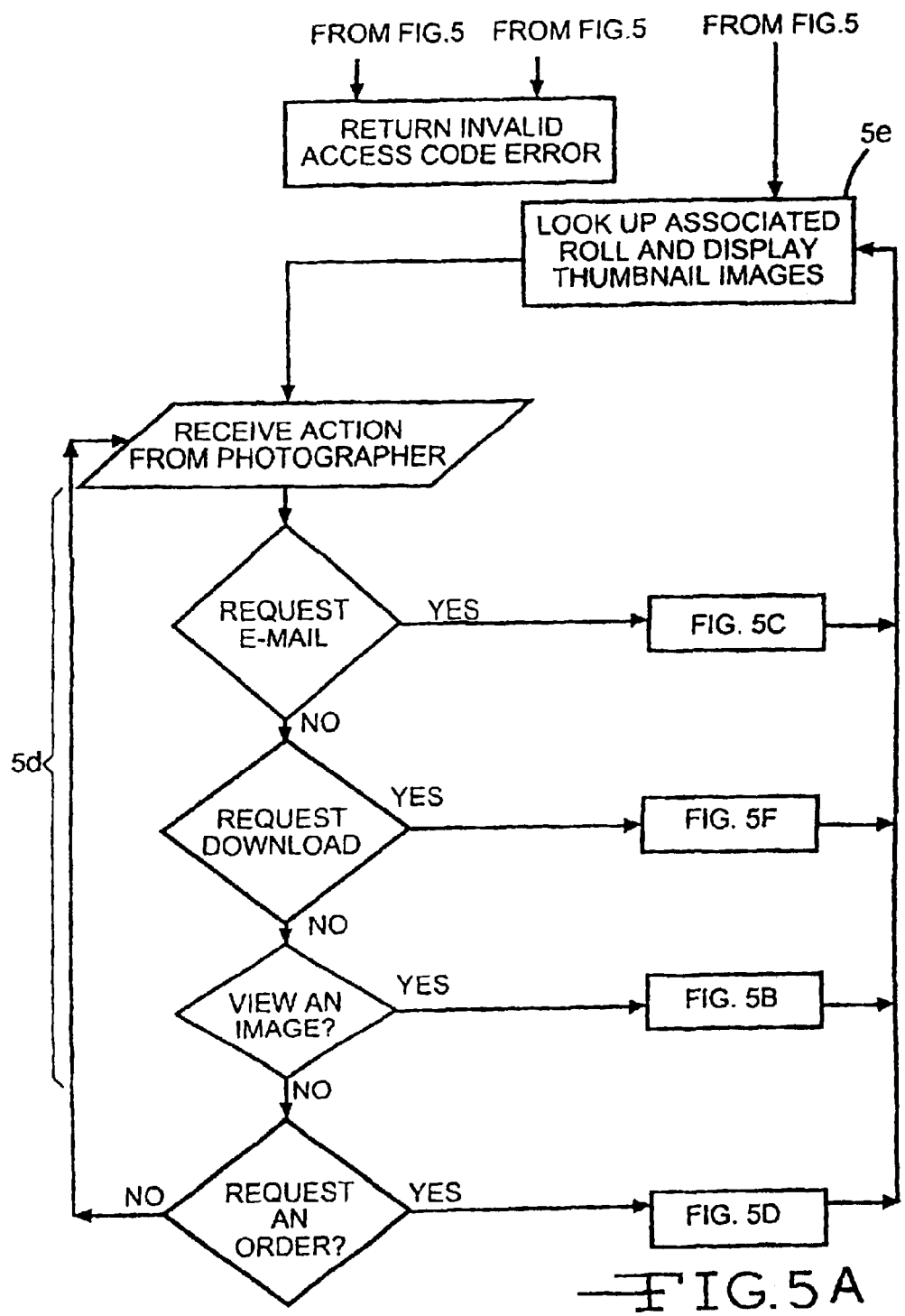

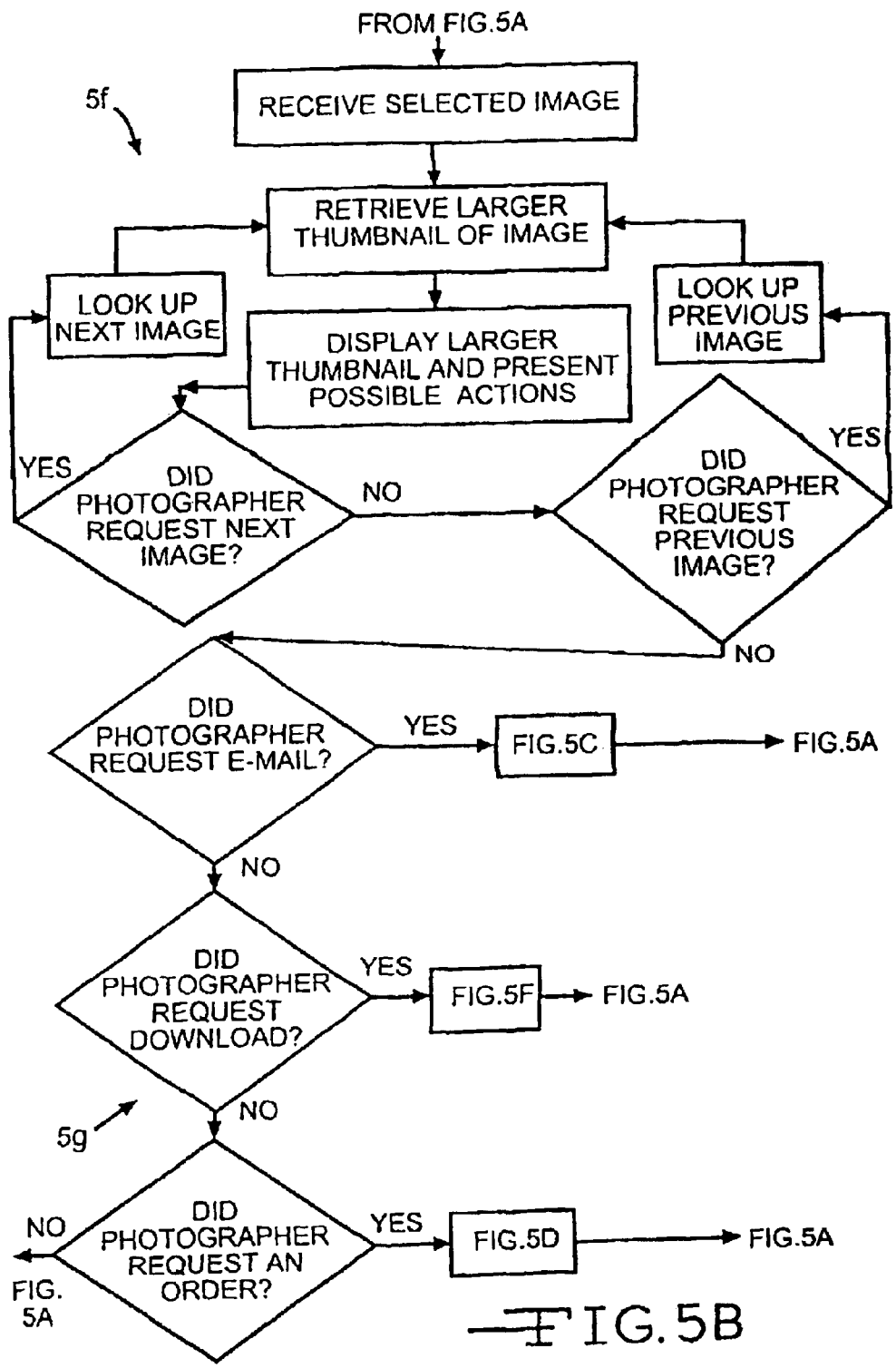

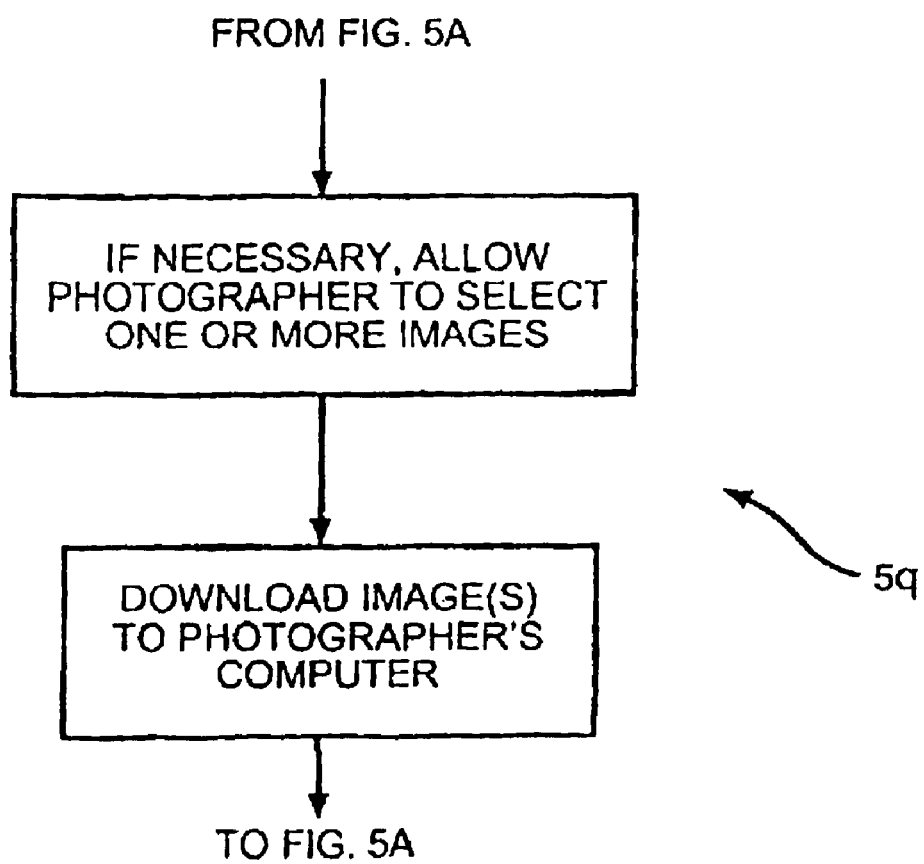

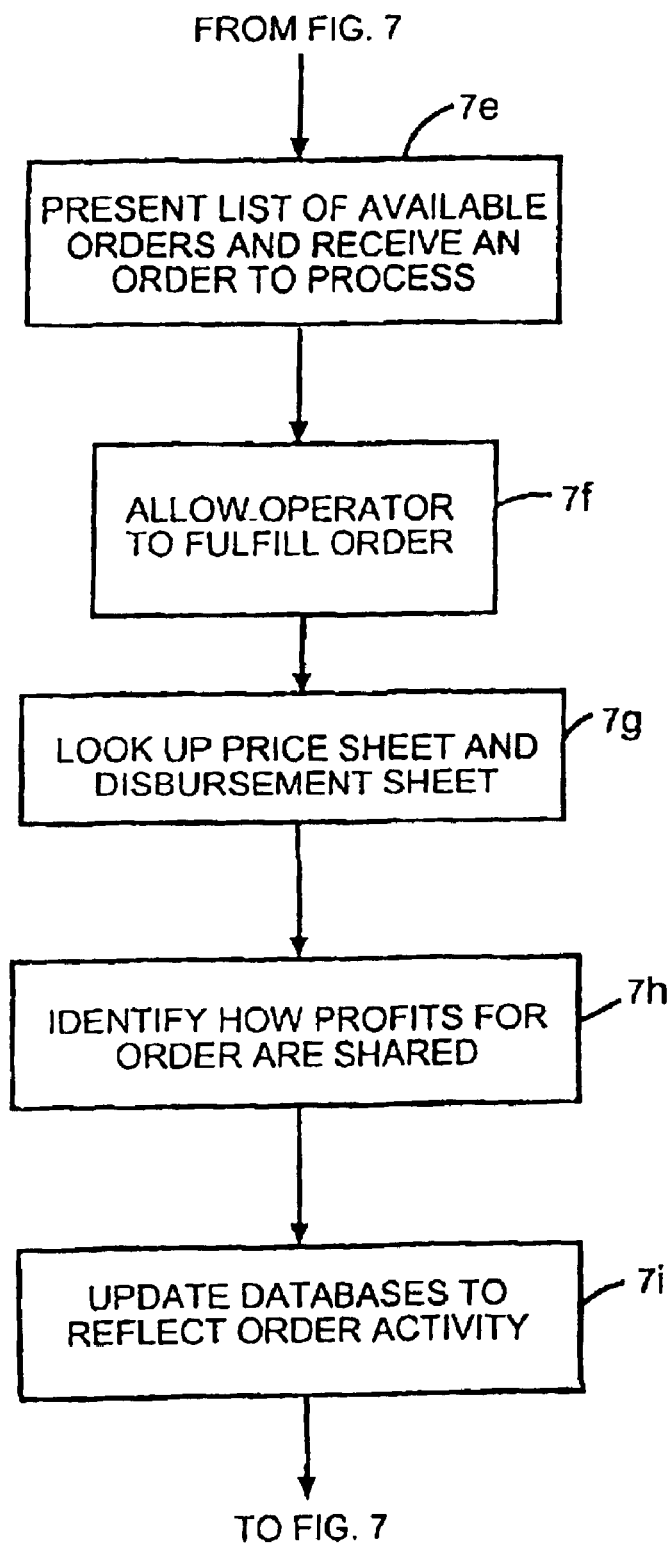

METHOD OF PROCESSING A ROLL OF EXPOSED PHOTOGRAPHIC FILM CONTAINING PHOTOGRAPHIC IMAGES INTO CORRESPONDING DIGITAL IMAGES AND THEN DISTRIBUTING VISUAL PRINTS PRODUCED FROM THE DIGITAL IMAGES

CROSS REFERENCE TO RELATED APPLICATIONS

This is a Continuation of application Ser. No. 09/490,341, filed Jan. 24,2000, now U.S. Pat. No. 6,512,570 entitled "A METHOD OF PROCESSING A ROLL OF EXPOSED PHOTOGRAPHIC FILM CONTAINING PHOTOGRAPHIC IMAGES INTO CORRESPONDING DIGITAL IMAGES AND THEN DISTRIBUTING VISUAL PRINTS PRODUCED FROM THE DIGITAL IMAGES" by Philip N. Garfinkle, Yaacov B. Yaacov and Elliot D. Jaffe, which is a continuation of U.S. patent application Ser. No. 08/773,756, filed Dec. 24, 1996, (now issued as U.S. Pat. No. 6,017,157 to Garfinkle et al.).

FIELD OF THE INVENTION

This invention relates to a method of processing digital images of at least one photographic image and distributing visual prints produced from the digital images. More particularly, this invention relates to a method of processing at least one digital image of at least one photographic image and distributing visual prints in various formats corresponding to the at least one digital image.

BACKGROUND OF THE INVENTION

In a common photographic process, a series of photographic prints are taken with a camera and the exposed film is sent to a photographic laboratory where the film is developed. In the developing process, the exposed film is transferred in darkness into a developing solution, which causes any affected grain of the latent image to be wholly converted into silver. After a brief rinse in a stop bath of acid or water to remove developer and to stop development, the film is fixed in a solution of sodium thiosulfate or in a more rapid fixing solution. These solutions dissolve and remove the unchanged silver salts, thus rendering the film insensitive to light. The film is then washed and dried. Each picture is now a transparent negative in which light parts of the object are represented by dark areas and dark parts by light areas.

A large negative can be used to make a contact print, but small negatives are usually placed in an enlarger in which light from a lamp throws an enlarged and accurately focused image onto a piece of printing paper that has been coated with an emulsion similar to that on the film but less sensitive to light. The paper is then developed and fixed to form a positive print. The developed photographic prints are then provided to the photographer.

Although the photographic process of developing and distributing photographic prints has proven satisfactory, further improvements in the field of processing and distributing photographic film are desired. An object of the present invention is to provide a method of processing digital images of at least one photographic image and distributing visual prints produced from the digital images. Yet another object of the present invention is to provide a method of processing digital images of at least one photographic image and distributing visual prints through the use of an interface such as an HTML interface, client interface, or received via a telephone operator or printed order. Still another object of the present invention is to provide a method of processing digital images of at least one photographic image and distributing visual prints that is economical and easily accessible through a secure network.

SUMMARY OF THE INVENTION

This invention is directed to a server having digital images stored thereon, one or more images of the digital images having a unique access code for selectively identifying the location of the server where the one or more of the images are stored, the server transmitting the one or more images to a remote computer at a remote location in response to an order submitted by the remote computer over a communication network for viewing of the images, wherein the unique access code is used to identify the location of the server where the images are stored, the server and communication network providing for the viewing and ordering of goods and/or services with respect to the one or more images during access to the server.

In accordance with yet another aspect of the present invention there is provided a method for selectively receiving an order for a digital image over a communication network, comprising the steps of storing one or more digital images on a server, assigning a unique access code to the one or digital images for identifying the location of the server where the one or more digital images are stored, allowing selective access to the one or more digital images from a remote location to the server over a communication network using the unique access code for viewing of the one or more digital images and transmitting of an order during access to the server and receiving the order with respect to the one or more images over the communication network wherein the unique access code was used for accessing the one or more images.

In accordance with yet another aspect of the present invention there is provided a system for selectively transmitting digital images from one server over a communication network to a computer, comprising a server where digital images are stored, one or more images of the digital images having a unique access code; the unique access code identifying both the server where the one or more images are stored and the one or more images; the server accepting at least one order from a remote computer with respect to the one or more images wherein the unique access code is utilized by the computer for locating the server, allowing selective access by the computer to the one or more images, and for contemporaneously viewing and ordering of goods and/or services on the computer over the communication network.

In accordance with yet another aspect of the present invention there is provided a method of processing digital images stored in a server and allowing selective distribution of the digital images over a communication network, comprising the steps of providing at least one server wherein digital images are stored wherein a unique access code is assigned to one or more images of the digital images; facilitating selective authorized access over the communication network to the one or more digital images using the unique access code for locating the server on which the one or more images are stored and providing the contemporaneously viewing and ordering of goods and/or services over the communication network with respect to the one or more images and receiving an order over the communication network with respect to at least one of the digital images.

The at least one digital image of at least one photographic image may be acquired from exposed photographic film or from a digital camera.

BRIEF DESCRIPTION OF THE DRAWINGS

Further features and other objects and advantages of this invention will become clear from the following detailed description made with reference to the drawings in which:

FIGS. 7–7A is a schematic of the Administrative Interface C;

DETAILED DESCRIPTION OF THE INVENTION

Figure 1:
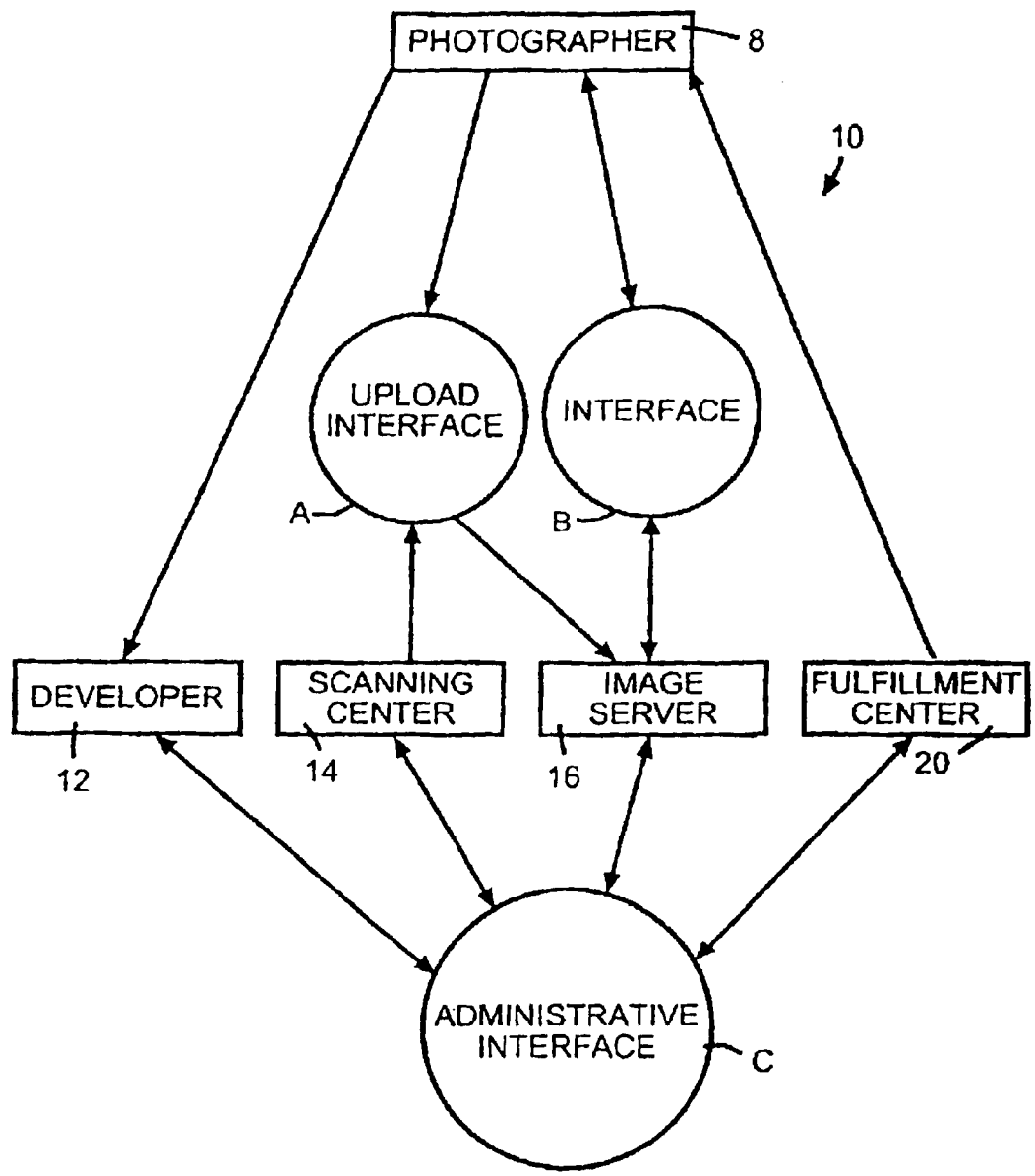
FIG. 1 is a drawing illustrating the invention methodology of processing digital images of at least one photographic image and distributing visual prints produced from the digital images.

Referring to the drawing wherein like reference characters represent like elements, the invention is illustrated in FIGS. 1–7A is a method 10 of processing digital images of at least one photographic image and distributing visual prints in various formats corresponding to the at least one digital image of the at least one photographic image.

Figure 9A:
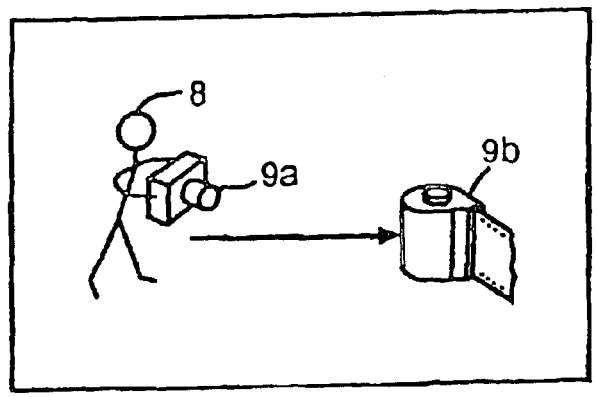
FIGS. 9A–9C are representative illustrations of a Photographer.
Figure 9B:
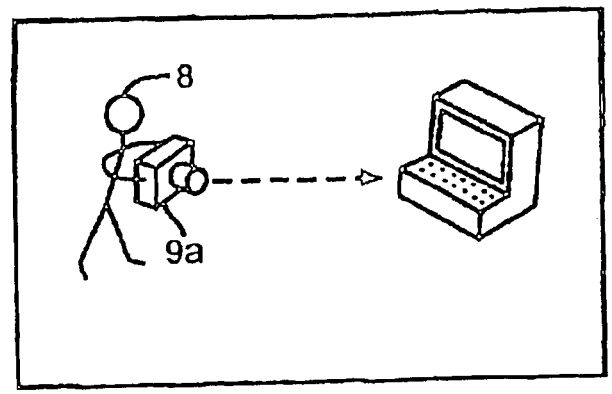

Briefly, referring to FIGS. 9A and 9B, the illustrated methodology 10 is used in association with a conventional photographic process wherein an object(s) or subject(s) are posed in front of a camera and one or more pictures are taken of the object(s) or subject(s) by a photographer 8 utilizing the camera 9a. The camera may be a conventional camera 9a using photographic film or a digital camera of a type well known in the art.

Figure 2:
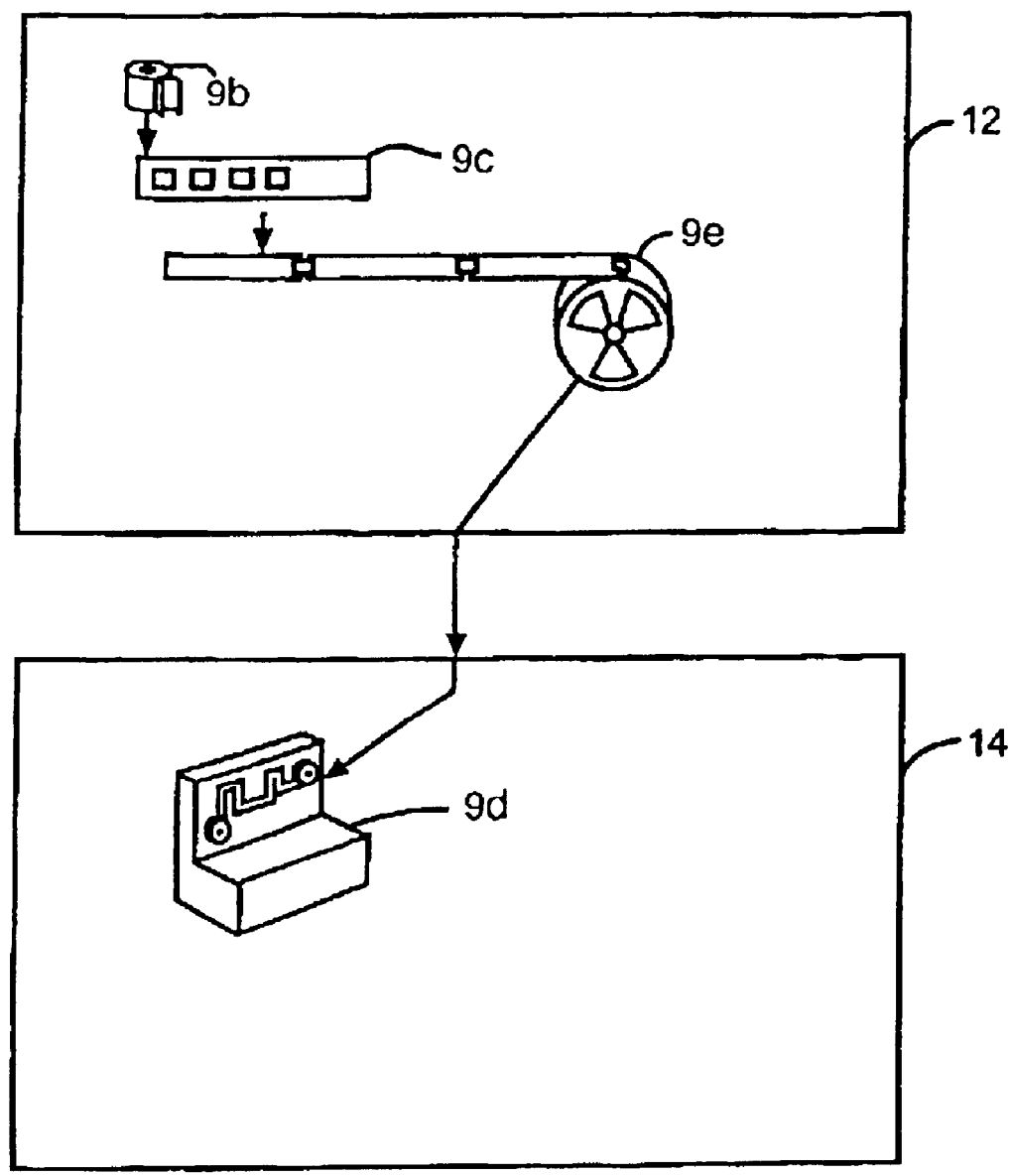
FIG. 2 is an illustration of a Developer and Scanning Center.
Figure 3:
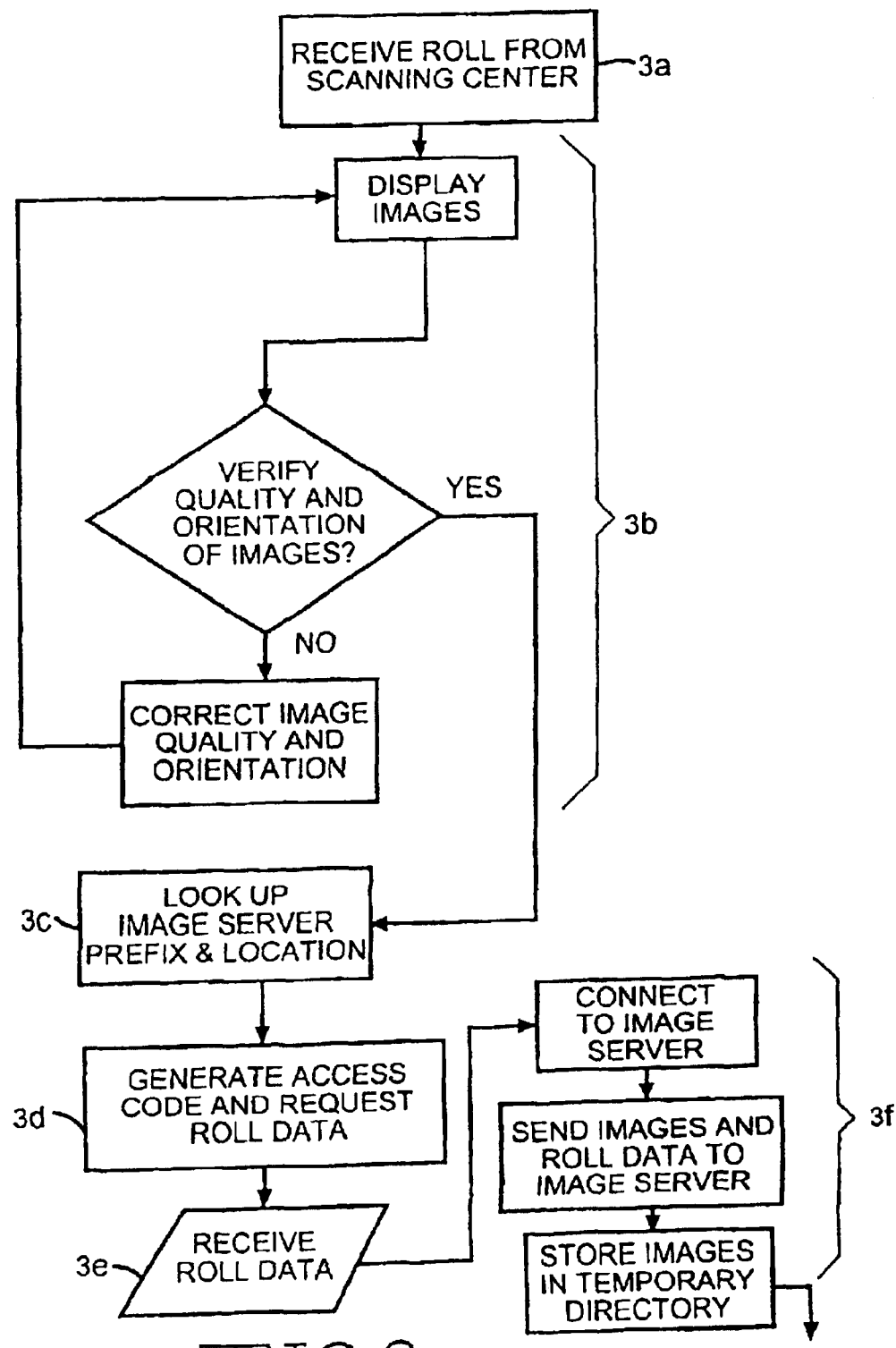
FIG. 3 is a schematic of the upload interface A between the scanning center and the image server of FIG. 1.
Figure 3A:
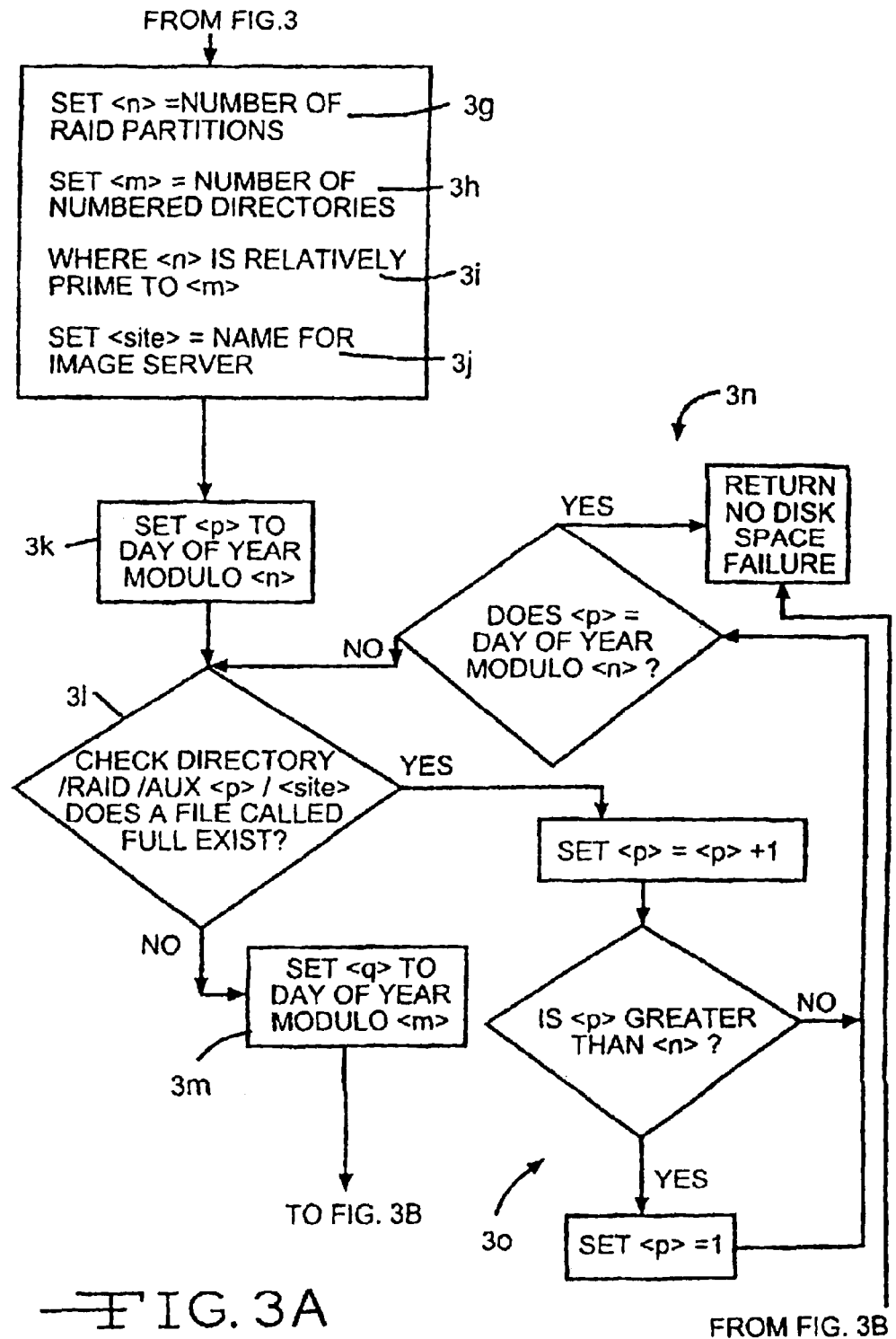
FIGS. 3A–3B are a schematic of the processing of images in the upload interface A.
Figure 3B:
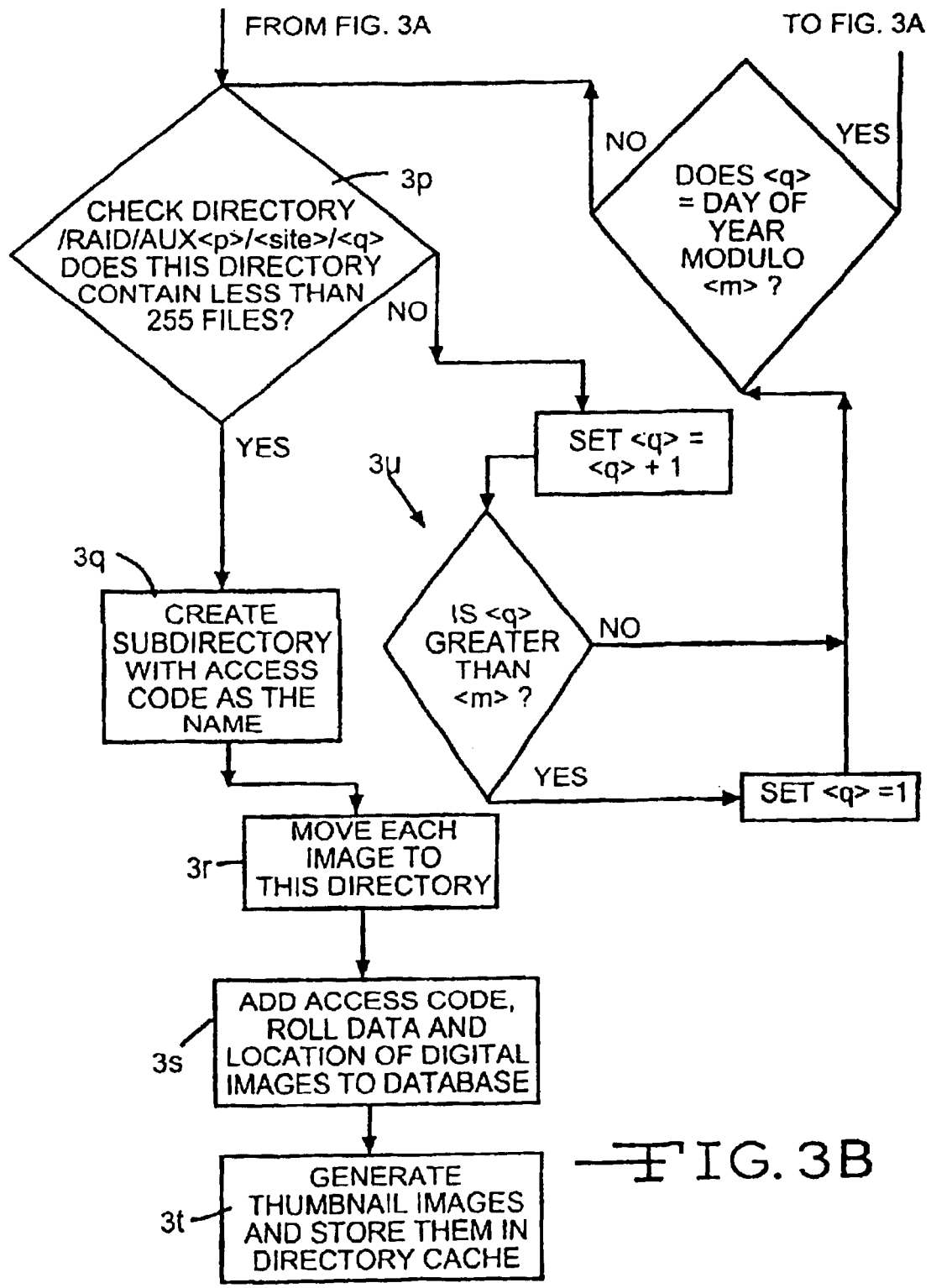
Figure 4:
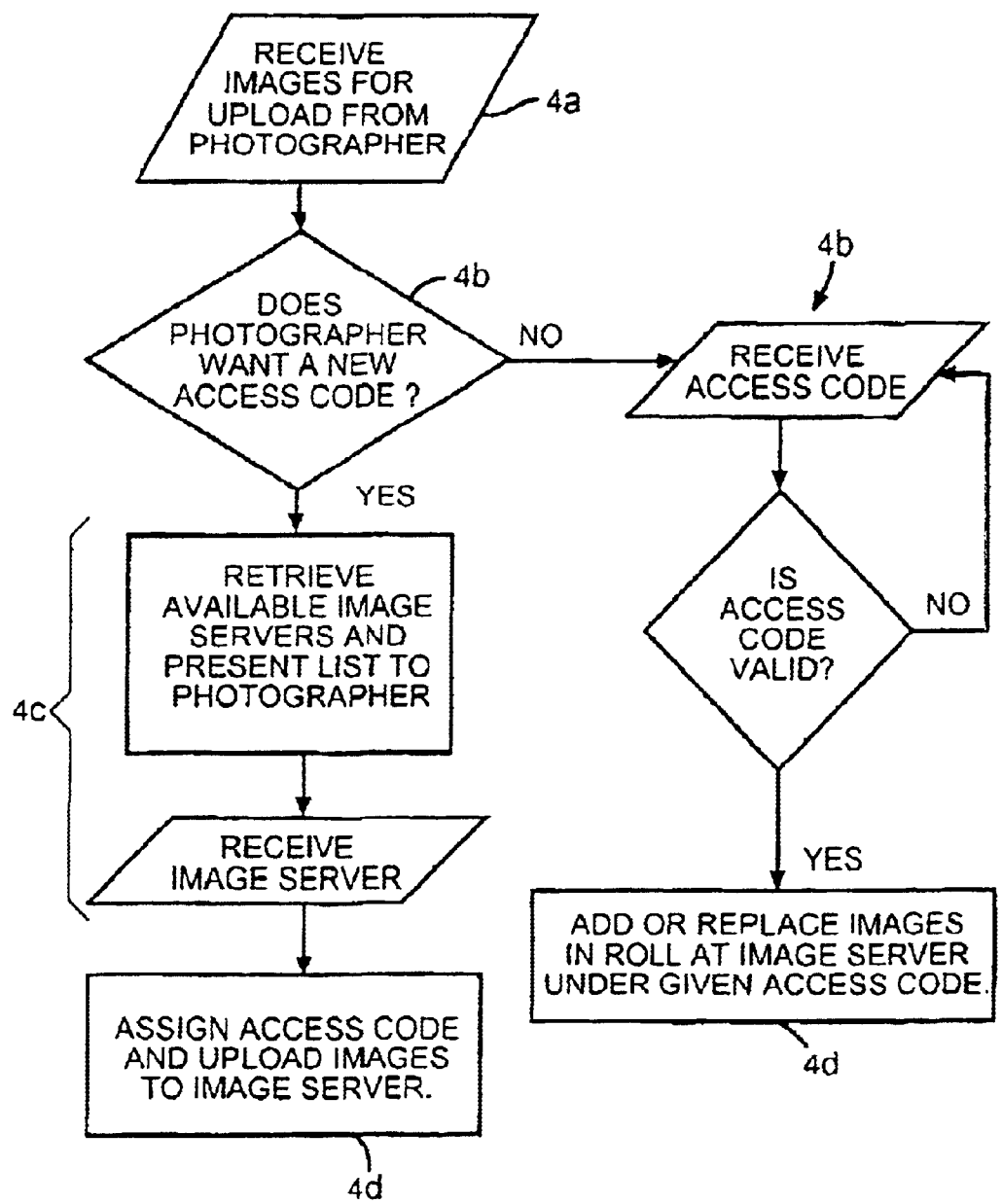
FIGS. 4 is a schematic of the upload interface A from the photographer to the image server.

When using photographic film, the exposed photographic film 9b is then sent to a developer 12, e.g., a photographic laboratory, where the photographic film is developed in the traditional manner as well known in the photographic industry, see FIG. 2. The developed photographic film is then scanned at a scanning center 14 to acquire a digital image of the photographic image on the photographic film, see FIG. 2 and stored on one or more image servers 16, see FIG. 9B. In an alternate embodiment, a digital image from the digital camera of the photographic image is uploaded directly to one or more image servers 16.

Selective authorized access to an image of the photographic image is then provided through an interface B as further described herein. Orders for visual prints in various formats corresponding to the photographic image are then received and fulfilled from a fulfillment center 20, also as further described herein.

The establishment which receives the roll of film for development will be referred to herein as the "developer" 12. The developer 12 may only act as an intermediary between the photographer 8 and the entity that actually develops the roll of film or the developer may actually develop the roll of film. As used herein, the "photographer" refers to any party having authorized access to the images and is not necessarily limited to the party that took the pictures. The establishment which scans the roll of film and sends (or uploads) it to the image server 16 will be referred to herein as the "scanning center" 14. The establishment which fulfills, charges, and delivers the order will be referred to herein as the "fulfillment center" 20. The developer 12 and/or the scanning center 14 and/or the fulfillment center 20 can be at the same physical location and may be the same entity.

In accordance with one embodiment of the present invention, in the development process either a negative strip 9c (cut or uncut) is generated and marked for digital processing or a series of developed photographic prints is made at the photographic laboratory from the roll of film and sent to the scanning center 14. At the scanning center 14, the developed photographic prints and/or negative strips are then converted into digital images. The developed photographic prints and/or negative strips are converted into digital images by a scanner 9d of a type well known in the art. For example, digital images may be scanned from a negative strip on a negative scanner or from developed photographic prints on a flatbed scanner.

In a preferred embodiment, scanning occurs from the negative before the negative strip is cut. The negative is preferably scanned after the photographic film is developed and before any photographic prints are created. In a most preferred embodiment, all photographic images in the negative strip are scanned in a single pass by the scanner 9d. In an alternate embodiment, the negative strips are spliced together on a film reel 9e in a manner well known in the photographic industry, and the rolls are scanned automatically by a high-volume commercially available scanner 9d. Developed photographic prints may be scanned on a flatbed scanner (a typical set of prints from a roll can be scanned in about 10–20 minutes). Regardless of the method used to acquire the digital image, the preferred minimum size for the resulting image is 1024×1536 pixels with 24-bit color. It will be appreciated that color and exposure correction of the digital image may be performed after scanning using techniques well known in the art.

In an alternate embodiment, the digital images may be acquired through the photographer 8 by scanning or acquired directly from a digital camera of a type well known in the art.

The acquired digital images are then transferred electronically to one or more machines at a first location, e.g., computers, for storage as well know in the art. (See e.g., 3a, FIG. 3. As shown in FIG. 1, the digital images may be transferred by the photographer 8 and/or the scanning center 14 through an upload interface A.

Figure 5:
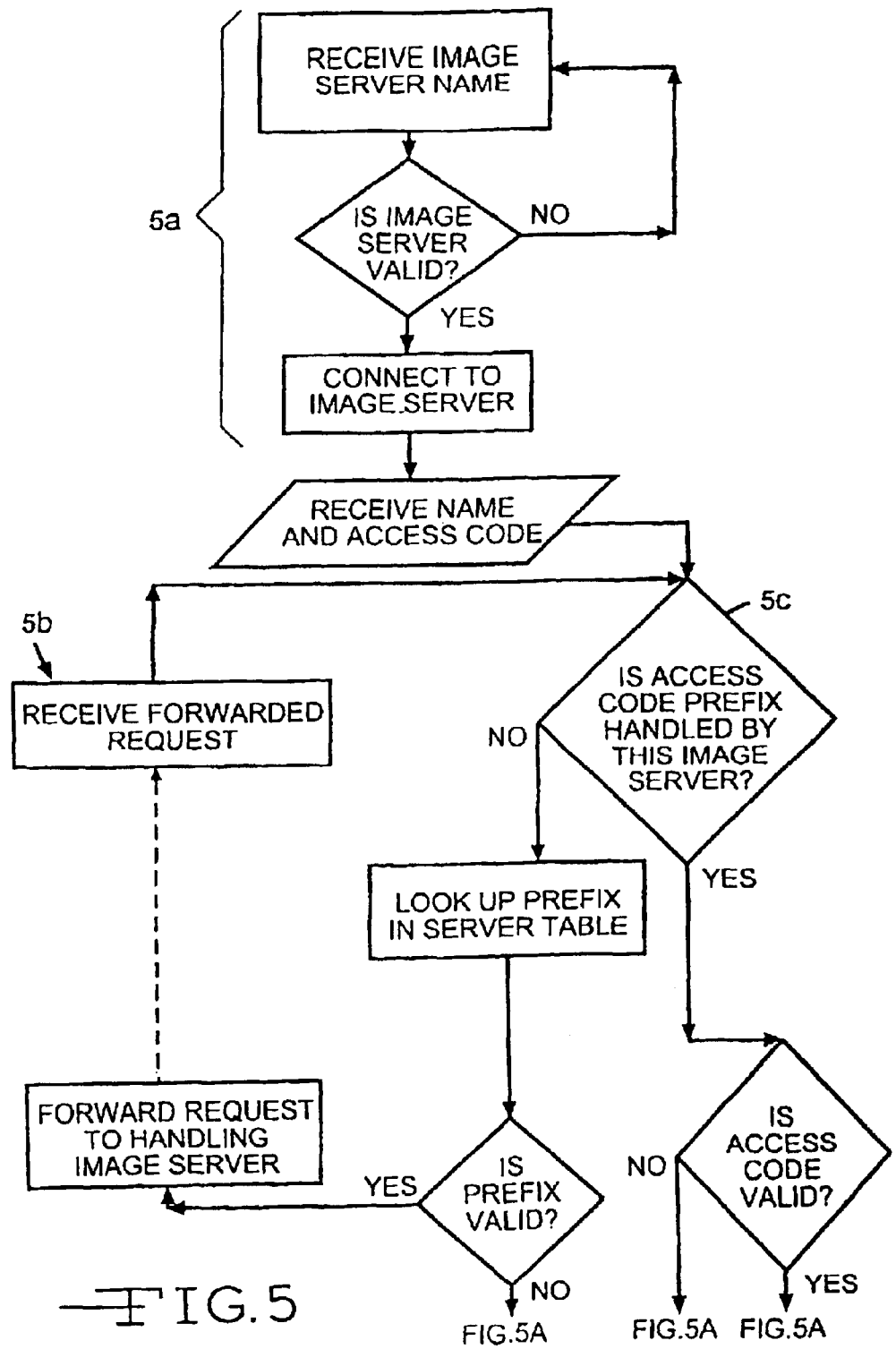
FIGS. 5–5F are a schematic of the Interface B.
Figure 5C:
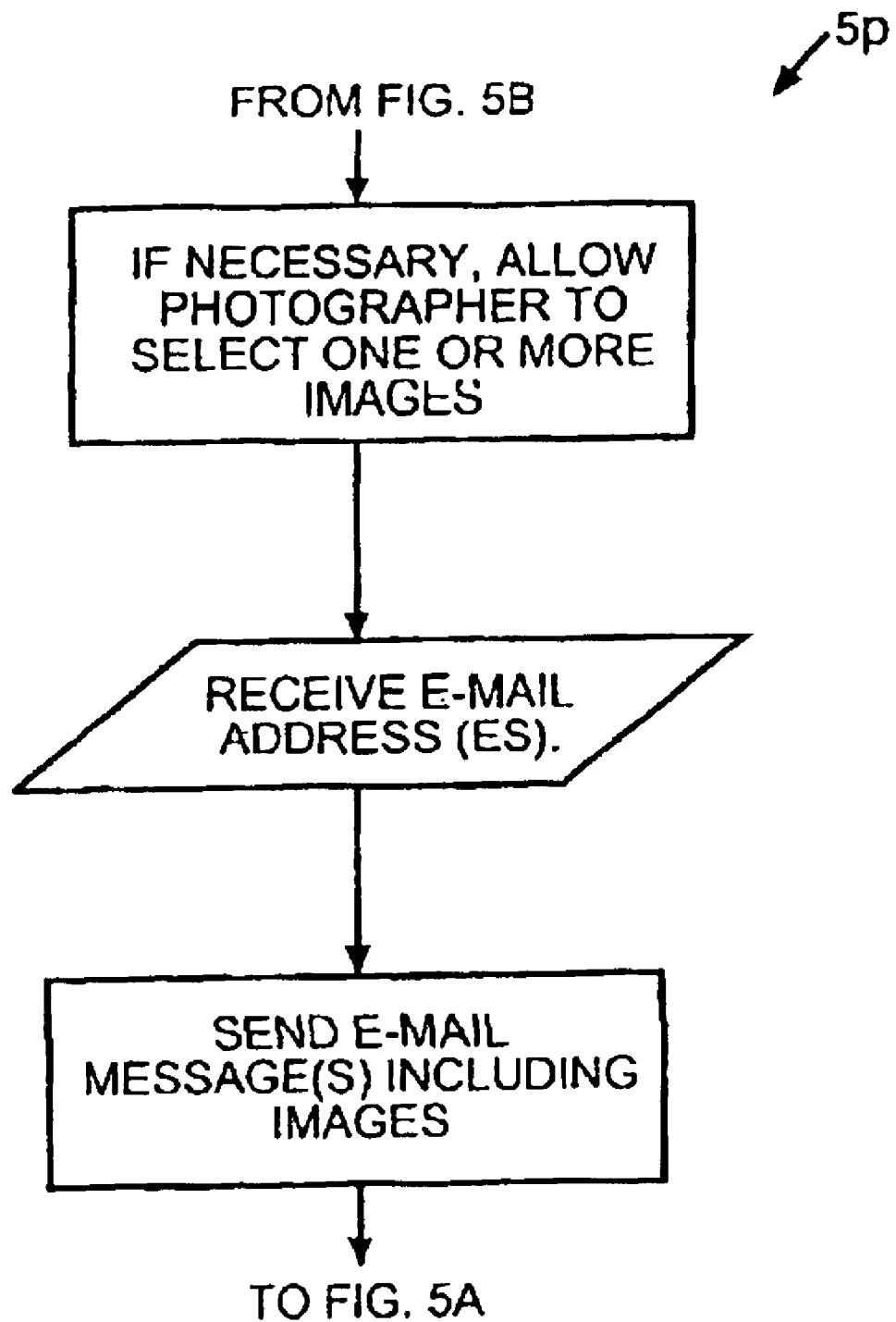
Figure 5D:
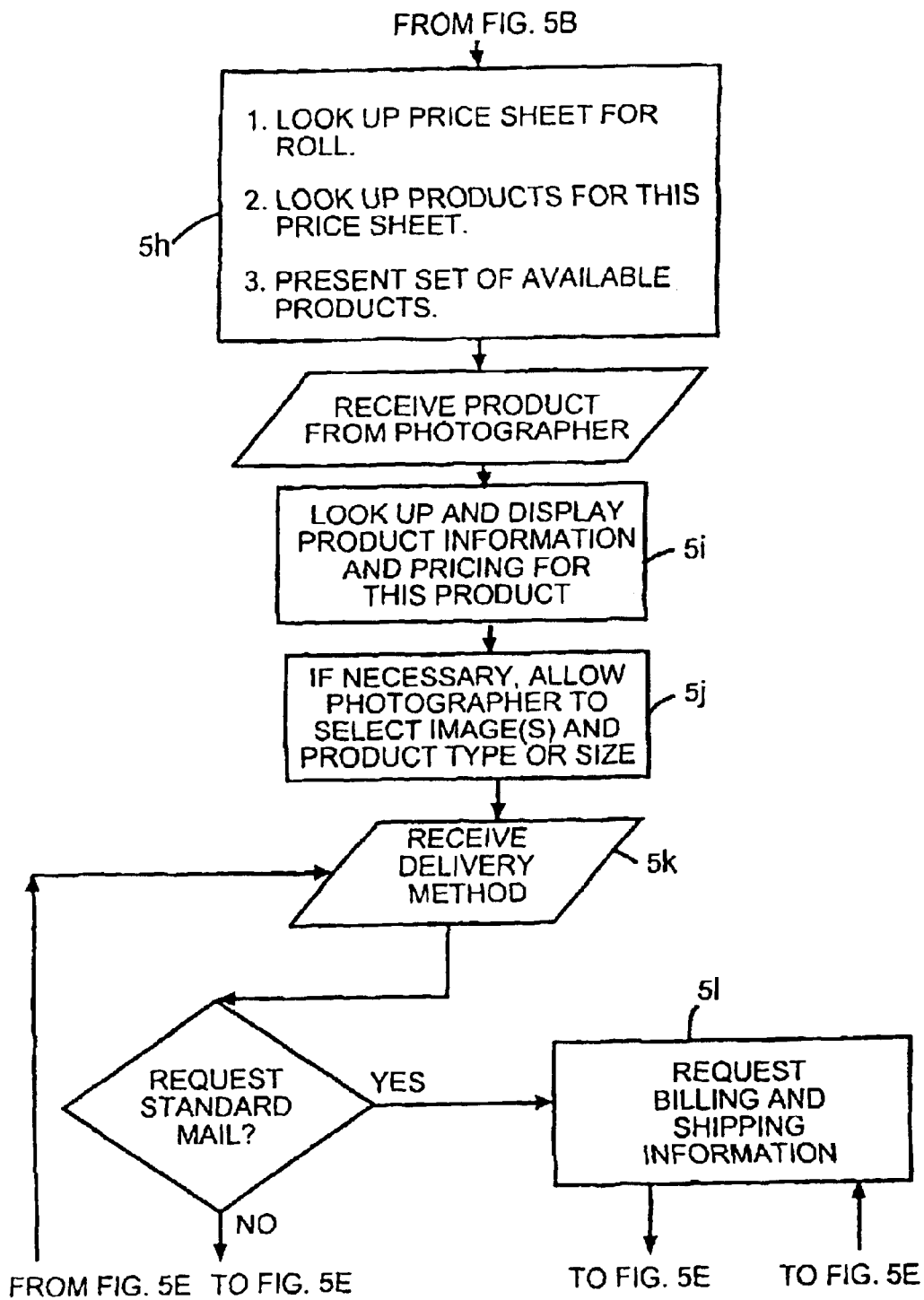
Figure 5E:
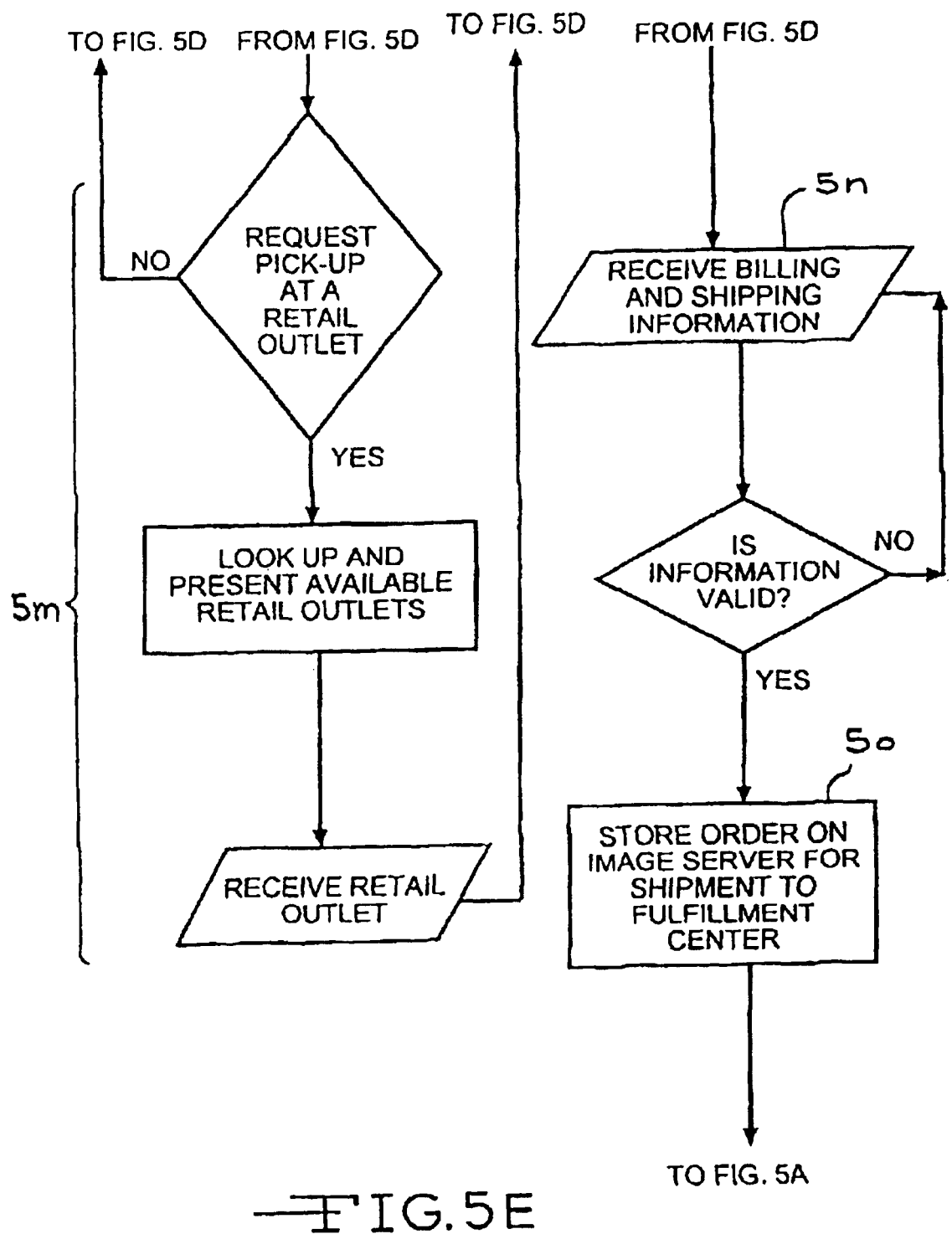
Figure 6:
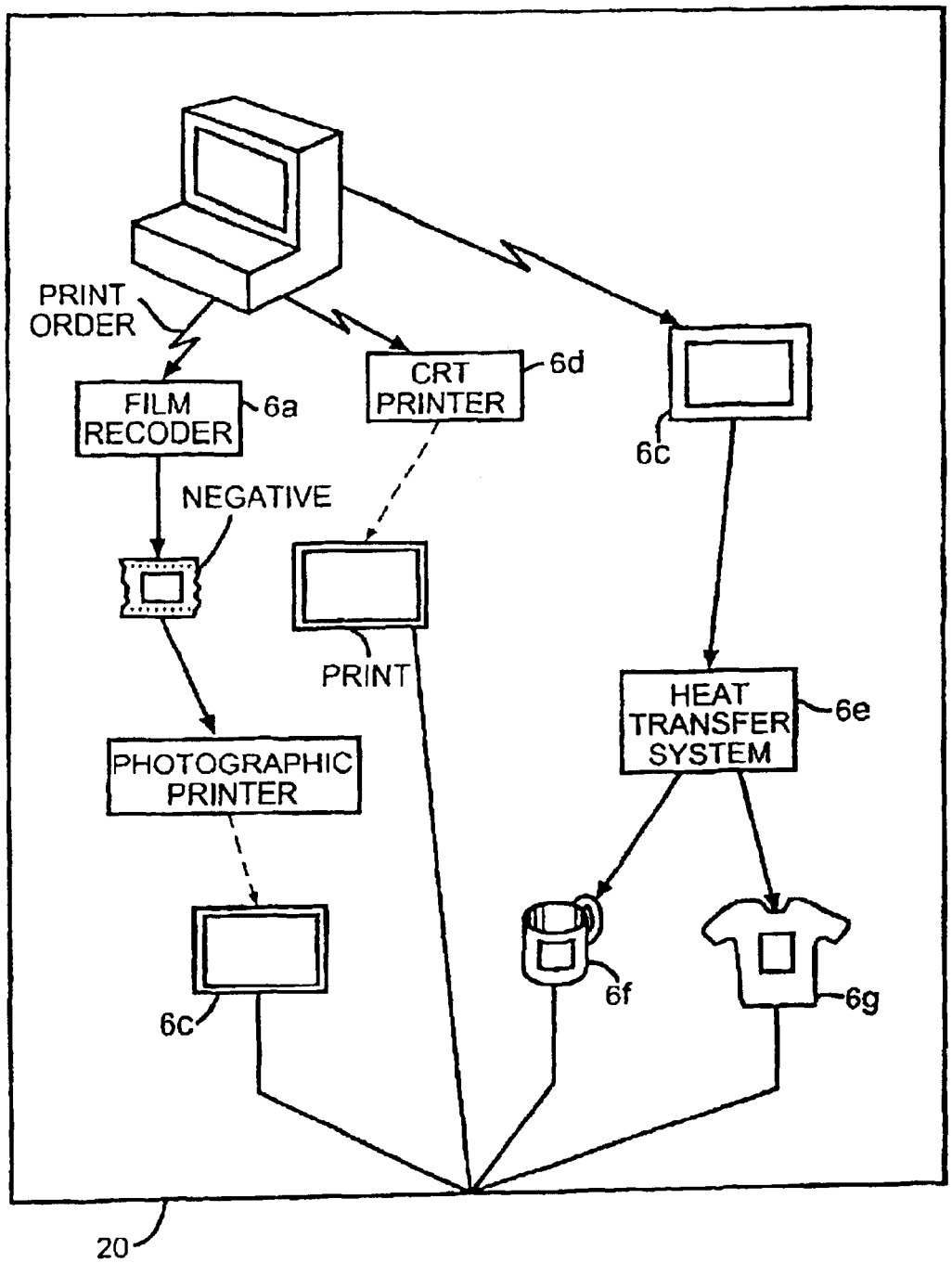
FIG. 6 is an illustration of a Fulfillment Center.
Figure 7:
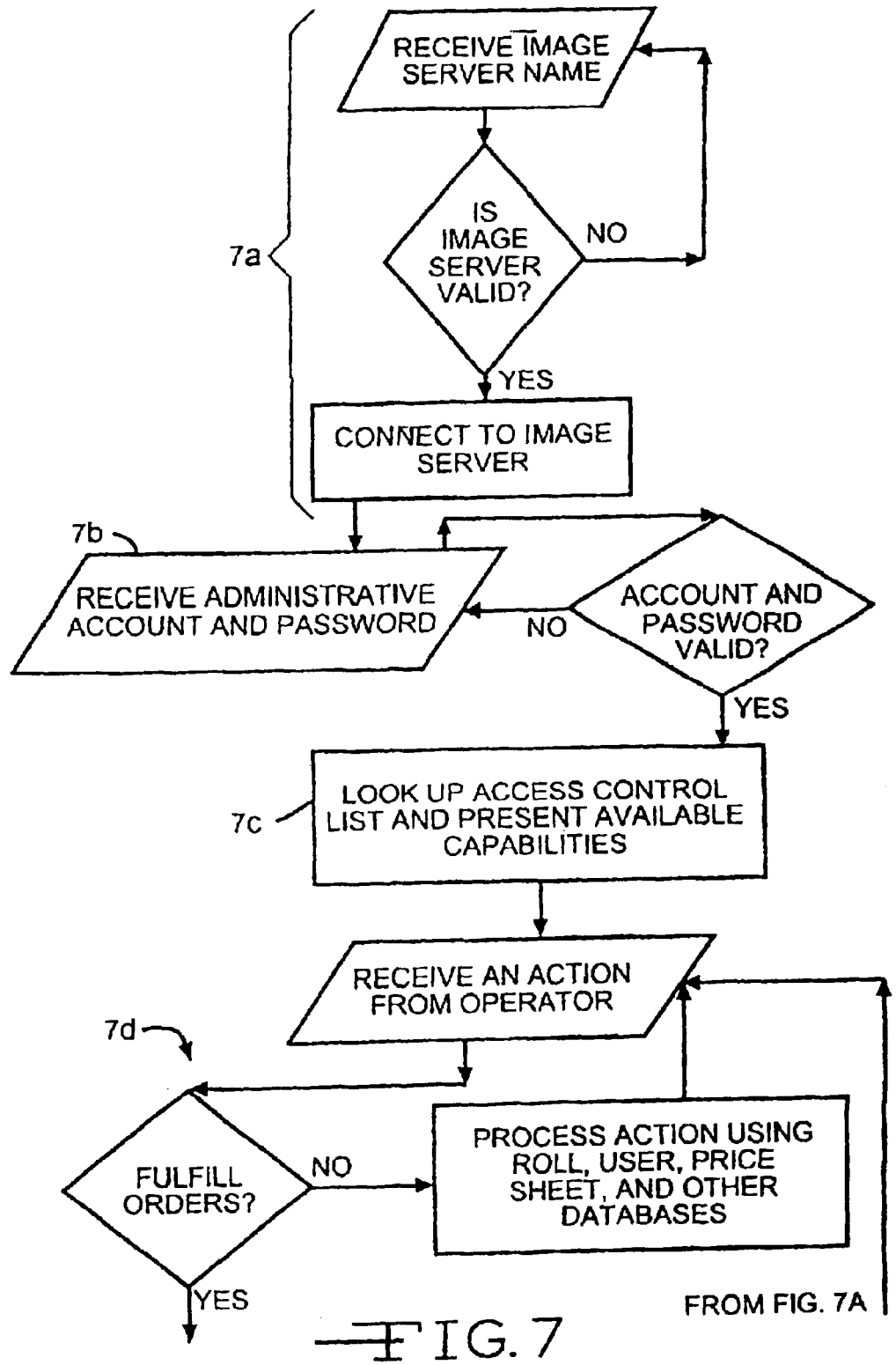

A machine useful for storing the digital images will be referred to herein as an "image server". In a preferred embodiment, the digital images are stored at a first location on one or more images servers 16 from which images are accessible by the photographer 8 through the use of an interface B. In a most preferred embodiment, each digital image is scanned in JPEG format and stored in a computer database on one or more image servers 16. For example, the individual digital images may be stored in a single directory on each image server 16, with database entries identifying the location of the digital images and any related information. Since the digital images may be stored on numerous image servers 16 as desired, a unique access code is provided that incorporates an identifier which identifies the location of the image server 16 where the digital images are stored. (See e.g., 3d, FIG. 3). In a preferred embodiment, the access code includes a prefix which identifies the digital images of interest and the particular image server 16 storing the digital images. (See e.g., 3c and 3d, FIG. 3 and 5c, FIG. 5). The access code may be selected by the scanner operator for each roll of film, based upon a desired set of criteria. For batch scanning of rolls of film, the access code may be selected based upon a pre-assigned number for the batch and a bar code associated with the roll of film which is automatically detected by the scanner during the scanning process.

In a preferred embodiment, the digital images and associated information are stored in a single directory on a local machine of the photographer 8 or at the scanning center 14. An operator at the scanning center or the photographer 8 uses the upload interface A to transfer the data (all images and associated information) to the image server 16, where it is stored in a directory on the image server. In a preferred embodiment, a Graphical User Interface (GUI) is used to verify the quality and orientation of the digital images before sending them to the image server 16. (See e.g., 3b, FIG. 3). The digital image and information are then processed at the image server 16 and incorporated into the image server database. (See e.g., 3f, FIG. 3).

It will be appreciated that this design allows for communication between the scanning center 14 or photographer 8 and the image server 16 to be interrupted at any time without causing a failure, since the digital images are not processed until the entire roll is stored at the image server. A partially uploaded roll of film may be deleted or the uploaded digital image re-used (if they are the correct size and have an identical checksum as the corresponding images at the scanning center 14).

In a most preferred embodiment, the image server 16 is at the same physical location as the scanning center 14, which allows a local network between the local machine and the image server to transfer images in an efficient manner via the upload interface A.

Preferably, the image server 16 stores the digital images in a commercially available database on a RAID disk partition to guard against disk failures, and the server data is archived on an archival medium (such as an 8 mm. tape drive) at regular intervals to guard against catastrophic failures.

Selective authorized access to an image of the developed film is then provided through the use of the interface B.

As previously described, a unique access code is associated with the digital images to facilitate secure viewing of the images from a separate second location through the use of the interface B. In addition to the access code, a name, phone number, e-mail address, store location (where the film was received), scanning location (where the digital images were created), current date and time, and other desired information may be assigned and/or collected for each roll of film. This information is transferred to the image server 16 through the upload interface A along with the digital images. (See e.g., 3e, FIG. 3).

In a preferred embodiment, an access code is associated with each roll of film (9b), and the digital images are accessed at the image server 16 through the use of the interface B by HyperText Markup Language (HTML) pages on the WWW (World Wide Web) or a client interface accessing an image server using a proprietary protocol over a computer network such as the Internet. Examples of a client interface include a plug-in module for the well-known Adobe PhotoShop or a stand-alone imaging application specially designed for this purpose.

Figure 9C:
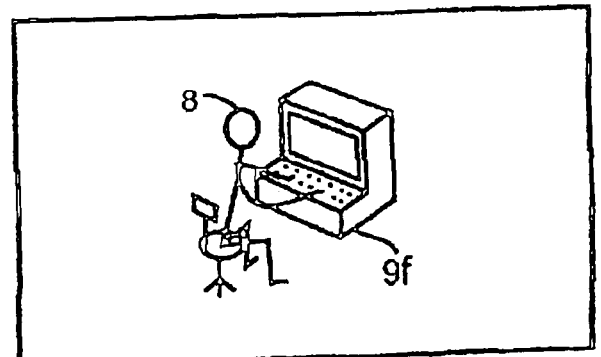

In a most preferred embodiment, the photographer 8 accesses HTML pages from a WWW browser using either the Secure HyperText Transport Protocol (HTTPS) or HyperText Transport Protocol (HTTP) to access a Netscape Enterprise Server running on an Axil 320 Sparc acting as the image server. The Netscape server is configured with an HTML forms interface which accepts the unique access code and provides access to thumbnails (small replicas of the full digital image) of the images in the roll in the form of an online proof sheet. The interface B allows the photographer 8 to perform specific tasks using the digital images, such as the ability to electronically mail (e-mail) an image to another party; download an image to the photographer's home computer 9f, see FIG. 9C; or order a visual print of a specific image in a variety of formats and sizes, such as photographic prints or enlargements of photographic prints, and photographic merchandise including T-shirts, sweatshirts, mugs, mouse pads, puzzles, ties, buttons, electronic slide shows, and other items bearing the digital image.

It will be appreciated that when downloading or e-mailing a digital image, the resolution of the digital image is preferably reduced to a screen size of 600×400 pixels or 712×512 pixels. These sizes are more appropriate for screen display of the digital images, and allow faster transfer of the data over a network.

In a preferred embodiment, the image server 16 is connected to the Internet to allow the processed digital images to be accessed from remote locations (second location) different from and independent of where the film is developed (first location). The digital images for a roll of film are maintained at the image server 16 for a fixed period of time (such as 30 days), after which they are marked as deleted and after a short grace period (such as 5 days), removed from the image server to free up disk space for other images. The grace period allows for fulfillment of orders which occur after a roll is marked deleted to be handled from the image server 16, since the roll is still on the image server (avoiding the need to reference a backup copy of the roll). In this embodiment, multiple RAID partitions are preferably used so that the image server 16 can continue to process new rolls of film when one partition is unavailable due to service or backup procedures as well known in the art. While a number of solutions exist for storing the digital image files for a particular roll in the RAID partitions, the process described below satisfies several important performance considerations, and is currently preferred. This process selects a directory on the image server 16 for storage of the digital images, and assumes that this location is stored along with the related roll information (e.g., access code, name etc.) in a database (with the access code serving as the primary index). The process for choosing a directory is as follows:

a) A directory called RAID is used, under which a directory exists for each file system partition (such as aux1, aux2, etc. up to 365 maximum partitions). Partitions are large enough to store a large number of rolls (generally 12–15 Megabytes per roll) but small enough to be backed up to a single tape (with 8 mm. tapes, roughly 7 Gigabytes per partition). (See e.g., 3g and 3k, FIG. 3). A partition directory is chosen by taking the number of partitions modulo the day of the year.

b) The preferred Axil machine runs the Solaris operating system (a version of UNIX) and can be configured to run multiple image servers (by responding to multiple IP addresses, such as www. Photonet.com, wolf.photonet.com, etc.). To allow for this situation, each partition directory contains a subdirectory for each such site (for example, www, wolf, etc.). (See e.g., 3*j*, FIG. 3). This allows multiple sites to share a single RAID directory tree.

c) If the site directory has a file called "FULL" in it, then the partition is considered unavailable and is not used. (See e.g., 3*l*, FIG. 3). If a FULL directory is encountered, then the next numeric RAID partition is used instead (wrapping back to the first directory, if necessary). (See e.g., 3*o*, FIG. 3). If all directories are full, then the roll processing fails and the roll is not stored in the database or available to the photographer. (See e.g., 3*n*, FIG. 3).

d) Under the site directory are a number of directories (such as "1," "2,", etc. up to 365 maximum directories). (See e.g., 3*h*, FIG. 3). This number must be relatively prime with respect to the number of RAID partitions available. (That is, the divisors of one number cannot be divisors of the other. The easiest way to accomplish this is if both numbers are prime.) (See e.g., 3*i*, FIG. 3). The image server takes the number of directories modulo the day of the year to determine which numeric directory to use. Determining directories based on the day of the year ensures that rolls of film processed on the same day will generally appear in the same directory. (See e.g., 3*m*, FIG. 3).

e) Each numeric directory can store up to 255 rolls of film since the UNIX file system is most efficient with no more than 255 files in a directory. (See e.g., 3*p*, FIG. 3). If a numeric directory is full, the next numeric directory is used (wrapping back to "1" if necessary). If all numeric directories are full, the next numeric partition directory is used, as in step C above. (See e.g., 3*u*, FIG. 3).

f) A directory with a name identical to the roll's access code is created under the calculated numeric directory. (See e.g., 3*q*, FIG. 3). Each image in the roll is stored as a separate file in this directory. (See e.g., 3*r*, FIG. 3).

Note that the foregoing procedure is only used to determine the location of the digital images. (See e.g., 3*s*, FIG. 3). After the location has been determined, the database entry for the digital images contains the digital image's location. All future access to the digital images is performed via the database entry for the digital images.

As previously mentioned, the preferred HTML interface allows the photographer to view thumbnails of digital images. The preferred thumbnail sizes are 16-bit true color images with resolutions of 50×34 pixels, 64×43 pixels, 96×64 pixels, and 160×107 pixels. The thumbnail digital images can be generated when the film is originally processed (the preferred method) or on-the-fly when the thumbnail digital images are requested by a photographer 8. In either case, the thumbnail digital images are cached at the image server 16 in a special directory reserved for this purpose. (See e.g., 3*t*, FIG. 3). Subsequent access to the thumbnail digital images may be obtained by retrieving them directly from this cache. Thumbnail digital images in the cache can be deleted as required, and regenerated as needed.

In a most preferred interface, a photographer 8 accesses the image server 16 from a remote second location in order to view an HTML page containing the thumbnail digital images. (See e.g., 5*a* and 5*e*, FIG. 5). If the photographer selects a particular thumbnail digital image, a larger version of that digital image is then displayed on a new HTML page. This later page also contains a procedure for allowing the photographer 8 to view the next or previous digital image, perform electronic transactions with the digital image (such as downloading the digital image to a local computer or e-mailing the digital image to another party), or order visual prints of the digital images in a variety of formats and sizes. (See e.g., 5*f* and 5*p* FIG. 5).

The photographer 8 can request that a copy of a digital image be downloaded (or sent) to a local remote machine from the image server 16. See e.g., 5*g* and 5*q*, FIG. 5). Preferably, the photographer 8 obtains a high-resolution copy of the digital image (e.g., 1024×1536 pixels) in order to retain a high-quality digital image. The photographer 8 may generate a digital image of sufficient detail to order additional formats of the image based on the new digital image.

The photographer 8 may also generate a new digital image based on the original digital image. The new digital image may incorporate changes or modifications over the original digital image such as modifying the color or exposure attributes of the digital image, merging data from multiple digital images into a single new digital image, or other standard image generation techniques available in applications such as Adobe PhotoShop and the like. The new digital image is then sent to the image server 16. (See e.g., 4*a*, FIG. 4). If desired, the new digital image may replace the original copy of the digital image at the image server 16, be added to the set of digital images available under the unique access code previously assigned, added under a new access code or added to a different preexisting access code. (See e.g., 4*b* and 4*d*, FIG. 4). In any case, the new digital image may also be available at the image server 16 and all interfaces B are available to the photographer 8 to view this digital image.

The photographer 8 can use the interface B consisting of the HTML interface to step forward or backward through the digital images in the roll, and each digital image may be viewed, downloaded, e-mailed (electronically mailed), or special ordered as a visual print. (See e.g., 5*d*, FIG. 5). It will be understood that the HTML interface is utilized by the photographer 8 in the sales process to determine which of the digital images (if any) the photographer would like to order as a visual print as well as the sizes, types, and number of visual prints to be ordered. (See e.g., 5*j*, FIG. 5)

As previously explained, the visual prints include photographic paper prints or items incorporating the digital image such as mugs, T-shirts, or other items. When placing an order, the photographer 8 may also be aided by digital image replicas of the various products that they can choose to order. Selecting a product replica initiates an ordering procedure for the selected product incorporating the selected digital image. Each image server 16 maintains a table of access code prefixes and associated image servers, which is used to automatically forward requests for digital images to the appropriate image server. (See e.g., 5*b*, FIG. 5). For HTML access to the image server 16, forwarding can be performed by returning a reference to an HTML page located at the remote server (second location).

For client interface access to the image server 16, the client can determine the appropriate image server to contact by making a remote procedure call to the known server. (See e.g., 4*c*, FIG. 4). Accordingly, a large number of geographically distributed image servers 16 are able to manage any number of digital images for a large number of geographically distributed photographers 8.

Figure 8:
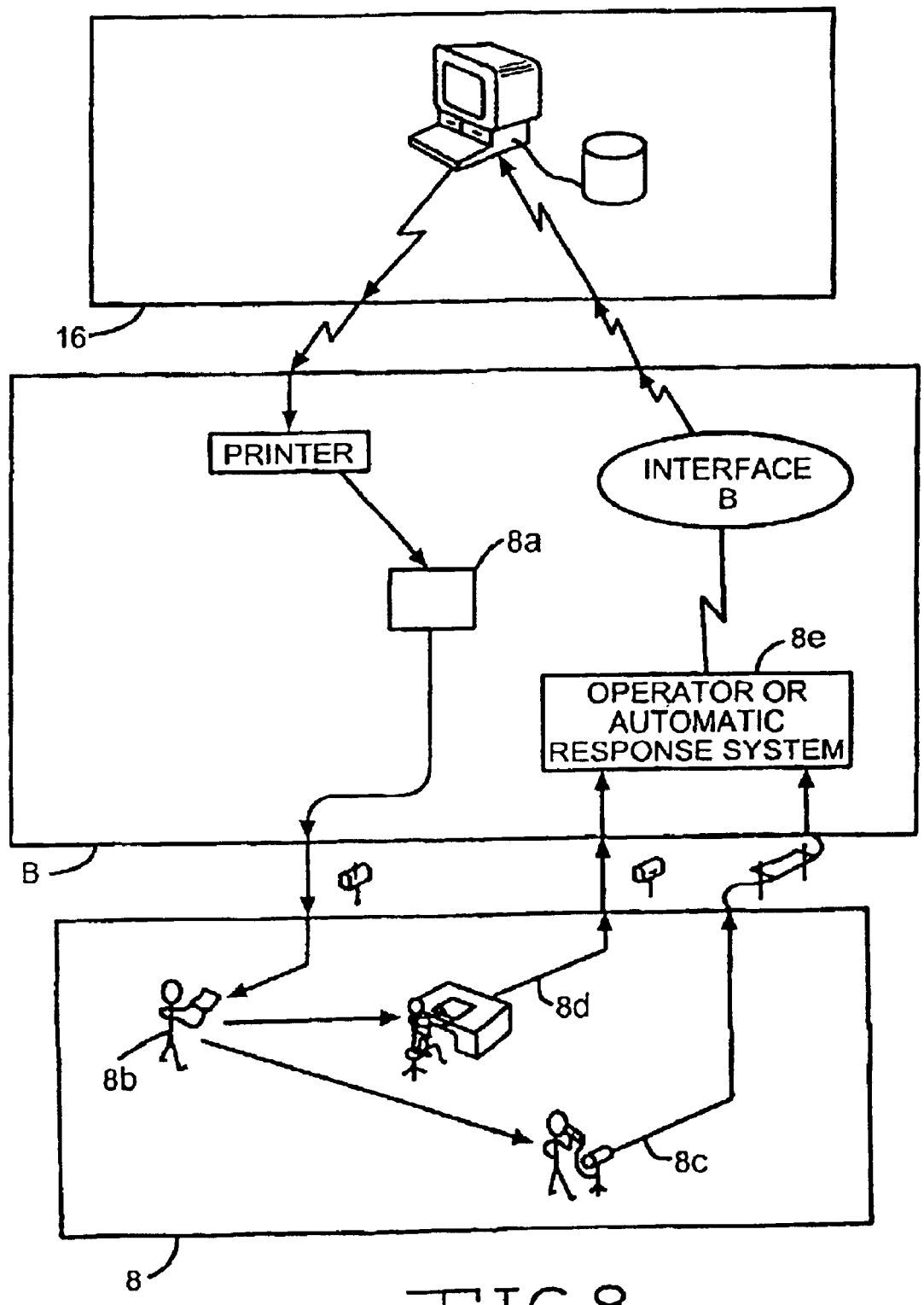
FIG. 8 is an illustration of an alternate Interface B between the Photographer and the Image Server.

In an alternate embodiment to the interface over a computer network, the interface B is presented as a physical representation of the image which is delivered through the normal postal service or the like FIG. 8. In this embodiment, the photographer 8 requests that one or more digital images be made available to a specified recipient. The requested digital images are placed on an index print, which is a small physical representation of each digital image together on a single print (much like the proof sheet or set of thumbnails, but as a printed photograph rather than on a computer screen). The index print 8a is assigned a unique access code and each image in the print is marked with a different number.

The index print 8a is then sent to the desired recipient 8b along with instructions for ordering photographic merchandise based on the delivered images. In a preferred embodiment, a toll-free number is provided, which the recipient 8b can immediately call 8c and place an order for a visual print based on any printed photograph in the index print. In an alternate embodiment, an order form can be included with index print, which the recipient can fill out and return to place an order 8d. For the toll-free telephone number, the order may be placed with a human operator or an automated response system 8e of a type commercially available. A human operator may utilize an interface similar to the HTML interface previously described above. However, the operator accesses the digital images on the server 16 using the unique access code provided by the caller. Otherwise, the types of screens, items to order and information collected are similar to the HTML interface previously described.

It will be appreciated that the image server 16 may receive rolls of film from a variety of developers 12, e.g., film development companies, portrait studios, development warehouses, individual camera shops and the like. These companies may desire to maintain control over the products offered for their rolls (that is, rolls from their photographers which are scanned into digital images and uploaded to the image server 16) and the prices of these products. Moreover, it will be appreciated that the larger development warehouses in turn service numerous drugstores, grocery stores, and other establishments, which also wish to maintain control of their offerings. The preferred method for supporting this functionality is to individually control each interface B by assigning each company an administrative account and password which is used while uploading a roll of film. This administrative account has access to one or more price sheets at the image server 16 uniquely associated with that account. Each price sheet is a table of products to offer and the prices for these products. The scanning center 14 assigns a price sheet for each roll of film when that roll is uploaded to the image server 16. The image server 16 uses this price sheet to display to the photographer 8 the products which may be ordered from their images and the price of each product. (See e.g., 5h, FIG. 5). This method allows the developer 12, e.g., original retail outlet (such as a drugstore) that accepts the roll of film (which is eventually made available from the image server), to control the products and pricing seen by the photographer 8 in the HTML interface or other interface B at a remote second location. (See e.g., 5i, FIG. 5).

When the photographer 8 uploads one or more digital images directly to the image server 16, these images are either added to a set of images already associated with an access code or the new images are assigned a new unique access code. When a new access code is assigned, a price sheet must be associated with these images in order to provide to the photographer 8 the visual prints which may be ordered using the new images. In a preferred embodiment, the photographer 8 selects a fulfillment center 20 which they prefer to use to fulfill all orders placed using the new images. A price sheet is associated with each fulfillment center 20, and this price sheet forms the basis for the products available to the photographer 8, and the prices of these products.

The fulfillment center 20 receives orders placed through the interface, B, e.g., HTML interface, client interface, or received via a telephone operator or written order based on an index print as previously described. (See e.g., 5o, FIG. 5 and 7e, FIG. 7). Once an order has been placed, regardless of the interface B employed, the order is fulfilled and delivered. From the fulfillment center 20 perspective, an order off an index print is no different than an order received over any of the other interfaces B. The visual prints are generated from the stored digital image, and the order is delivered to a specified location using techniques well known in the art. (See e.g., 5k, FIG. 5).

When an order is placed for a visual print, the photographer 8 provides the appropriate billing and shipping information and this information is stored on the image server 16. (See e.g., 5l and 5n, FIG. 5). In a preferred embodiment, the order may be charged to the photographer's credit card and delivered by standard mail to the photographer 8 at a specified address. (See e.g., 5o, FIG. 5). In this case, shipping charges are usually assessed in addition to the product charges. In an alternate embodiment, the order may be delivered to a retail outlet, e.g., developer 12, and picked up by the photographer 8. (See e.g., 5m, FIG. 5). In this case, the photographer 8 may use any method of payment accepted by the retail outlet, the credit card number of the party placing the order is preferably obtained by the image server 16 as a guarantee for the order.

In a most preferred embodiment, the image server 16 also provides an HTML-based administrative interface C which is accessible by the developer 12, the scanning center 14, the fulfillment center 20, and other appropriate parties. The interface C is accessed using an account and password unique to the party, and the capabilites a particular account can perform is limited by an access control list in a manner well known in the art. (See e.g., 7a, 7b, 7c, FIG. 7). Available capabilities include, but are not limited to, the ability to upload new rolls to the image server 16; view, edit, or delete rolls of film (that is, the images and information associated with the roll); view or edit charges associated with a roll of film; create or edit price sheets; view, edit, or fulfill orders; generate and print activity reports based on various criteria; and view or edit system administrators for the image server. (See e.g., 7d, FIG. 7). It will be appreciated that the individual capabilities may also be split between multiple interfaces. In order to support these capabilites, the image server 16 maintains multiple databases containing roll, user, price sheet and other administrative information, as well as tracking usage data for all activities performed on the image server. (See e.g., 7f and 7i, FIG. 7). In addition, the image server 16 also maintains a disbursement sheet associated with each price sheet. (See e.g., 7g, FIG. 7). The disbursement sheet identifies how any profits obtained from the orders are shared between the developer 12, the scanning center 14, the fulfillment center 20, and any other party. (See e.g., 7h, FIG. 7). The preferred method for these disbursements are as a percentage of the net margins. Furthermore, the disbursements for a particular party may be further disbursed to additional parties. For example, a party may sponsor a promotion for the sale of a visual print such as mugs in exchange for 10% of the fulfillment center's share of profits.

The creation of the visual prints from the digital image is performed using standard equipment available in the industry. In a preferred embodiment, a film recorder 6, see FIG. 6 such as an Opal recorder from Management Graphic, Inc. is used to generate a photographic negative 6b from the digital image. The negative is then used to generate a visual print 6c which is identical to the digital image on the appropriate merchandise. In an alternate embodiment, a cathode ray tube printer 6d such as those available from Konica USA or Bremson, Inc. creates the visual prints on photographic paper directly from the digital image. It will be appreciated that this avoids the cost of creating a negative, while still preserving the quality of a photographic print. For non-paper items such as mugs 6f or T-shirts 6g, the visual print 6c can be printed directly from the digital image, and adhered to an item using a heat transfer system 6e of a type well known in the art. In yet another embodiment, an alternate photographic printing method can be used, such as the Pictography 3000 system available from FujiFilm.

The patent applications, patents and documents referred to herein are hereby incorporated by reference.

It is to be understood that various other modifications and changes may be made without departing from the scope of the present invention. The present invention being limited by the following claims.

What is claimed is:

1. A server having digital images stored thereon, one or more images of said digital images having a unique access code for selectively identifying the location of said server where said one or more of said images are stored, said server transmitting said one or more images to a remote computer at a remote location in response to an order submitted by said remote computer over a communication network for viewing of said images, wherein said unique access code is used to identify the location of said server where said images are stored, said server and communication network providing for the viewing and ordering of goods and/or services with respect to said one or more images during access to said server.

2. A server according to claim 1 wherein said server and communication network also provides for the manipulation or printing said one or more images during access to said server 3. A server according to claim 1 wherein said communication network comprises the Internet.

4. A server according to claim 1 wherein said remote location comprises a client computer.

5. A server according to claim 1 wherein said unique access code also includes a prefix which identifies said server from a plurality of servers.

6. A server according to claim 1 where said one or more images are stored in a directory wherein each of said one or more images are stored as a file in said directory.

7. A server according to claim 1 wherein said digital images were obtained by scanning a photographic media.

8. A server according to claim 7 wherein said media comprises photographic film.

9. A server according to claim 7 wherein said media comprises photographic print.

10. A server according to claim 1 wherein said digital images were obtained by a digital capture device.

11. A method for selectively receiving an order for a digital image over a communication network, comprising the steps of:
   a. storing one or more digital images on a server;
   b. assigning a unique access code to said one or digital images for identifying the location of said server where said one or more digital images are stored;
   c. allowing selective access to said one or more digital images from a remote location to said server over a communication network using said unique access code for viewing of said one or more digital images and transmitting of an order during access to said server; and
   d. receiving said order with respect to said one or more images over said communication network wherein said unique access code was used for accessing said one or more images.

12. A method according to claim 11 wherein said order comprises the printing of said one or more images.

13. A method according to claim 11 wherein said one or more images are obtained from scanning a media.

14. A method according to claim 13 wherein said media comprises developed photographic film.

15. A method according to claim 11 wherein said one or more images are obtained from a client computer over said communication network.

16. A method according to claim 15 wherein a third party is provided with said unique access code for allowing selective access to said one or more images by said third party.

17. A system for selectively transmitting digital images from one server over a communication network to a computer, comprising:
   a server where digital images are stored, one or more images of said digital images having a unique access code; said unique access code identifying both said server where said one or more images are stored and said one or more images; said server accepting at least one order from a remote computer with respect to said one or more images wherein said unique access code is utilized by said computer for locating said server, allowing selective access by said computer to said one or more images, and for contemporaneously viewing and ordering of goods and/or services on said computer over said communication network.

18. A system according to claim 17 further comprising a fulfillment center for providing at least one good or service with respect to said one or more images in response to said order.

19. A system according to claim 17 wherein said server and communication network also provides for the manipulation or printing said one or more images during access to said server.

20. A system according to claim 17 wherein said communication network comprises the Internet.

21. A system according to claim 17 wherein said remote location comprises a client computer.

22. A system according to claim 17 wherein said unique access code also includes a prefix which identifies said server from a plurality of servers.

23. A system according to claim 17 where said one or more images are stored in a directory wherein each of said one or more images are store as a file in said directory.

24. A system according to claim 17 wherein said digital images were obtained by scanning a photographic media.

25. A system according to claim 24 wherein said media comprises photographic film.

26. A system according to claim 24 wherein said media comprises photographic print.

27. A system according to claim 17 wherein said digital images were obtained by a digital capture device.

28. A method of processing digital images stored in a server and allowing selective distribution of the digital images over a communication network, comprising the steps of:
   a. providing at least one server wherein digital images are stored wherein a unique access code is assigned to one or more images of said digital images;
   b. facilitating selective authorized access over said communication network to said one or more digital images using said unique access code for locating said server on which said one or more images are stored and providing the contemporaneously viewing and ordering of goods and/or services over said communication network with respect to said one or more images; and c. receiving an order over said communication network with respect to at least one of said digital images.

29. A method according to claim 28 wherein said order comprises printing said at least one images.

30. A method according to claim 28 wherein said one or more images are obtained from scanning a media.

31. A method according to claim 30 wherein said media comprises developed photographic film.

32. A method according to claim 28 wherein said one or more images are obtained from a client computer over said communication network.

33. A method according to claim 32 wherein a third party is provided with said unique access code for allowing selective access to said one or more images by said third party.

* * * * *